No. 761,669. PATENTED JUNE 7, 1904.
A. B. GRAHAM.
SHEET DELIVERY MECHANISM.
APPLICATION FILED JUNE 11, 1900.
NO MODEL. 6 SHEETS—SHEET 1.

Witnesses:
Frank S Blanchard

Inventor:
Alvaro B. Graham
By Banning & Banning,
Attorneys.

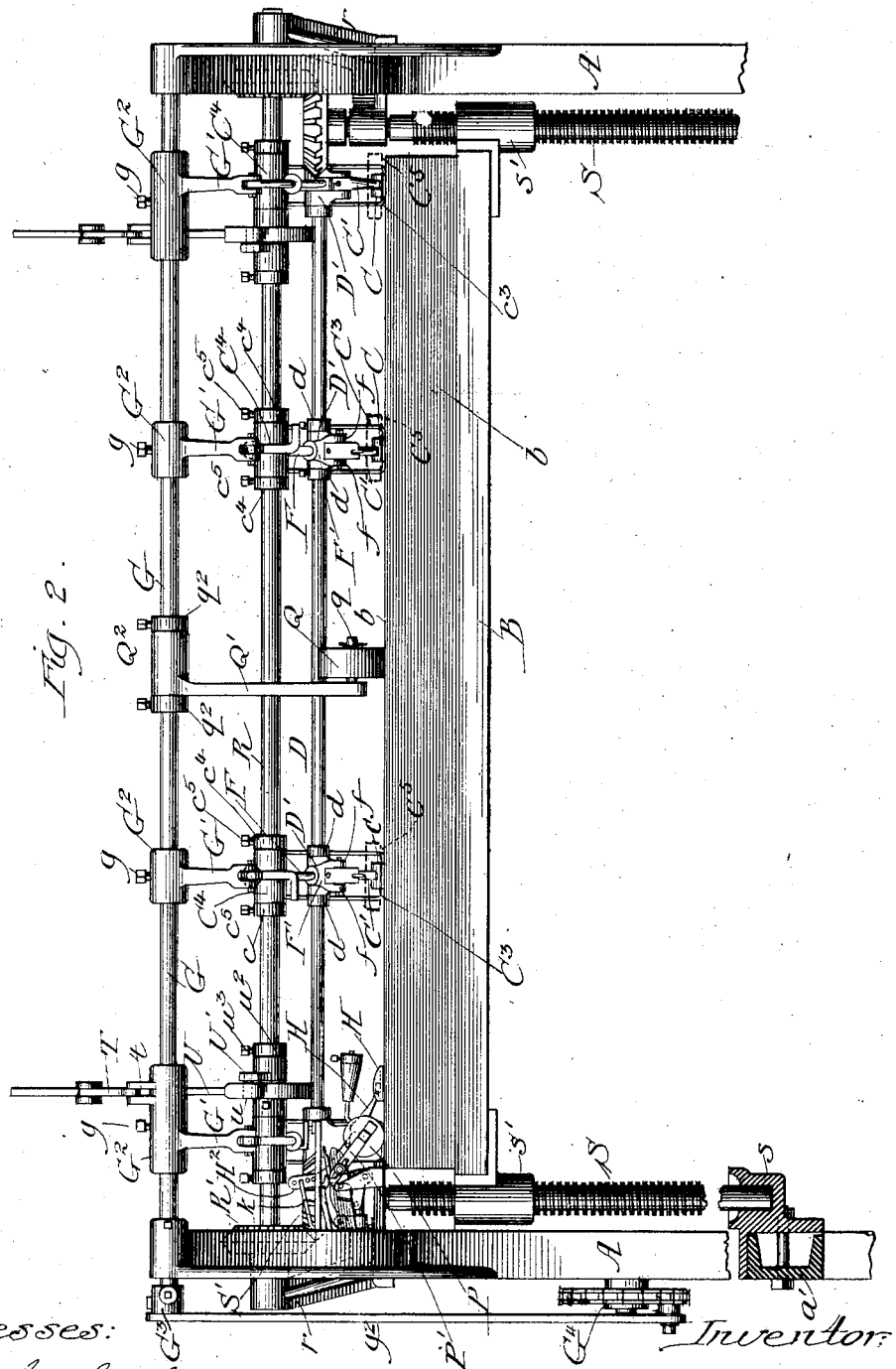

No. 761,669. PATENTED JUNE 7, 1904.
A. B. GRAHAM.
SHEET DELIVERY MECHANISM.
APPLICATION FILED JUNE 11, 1900.
NO MODEL. 6 SHEETS—SHEET 3.
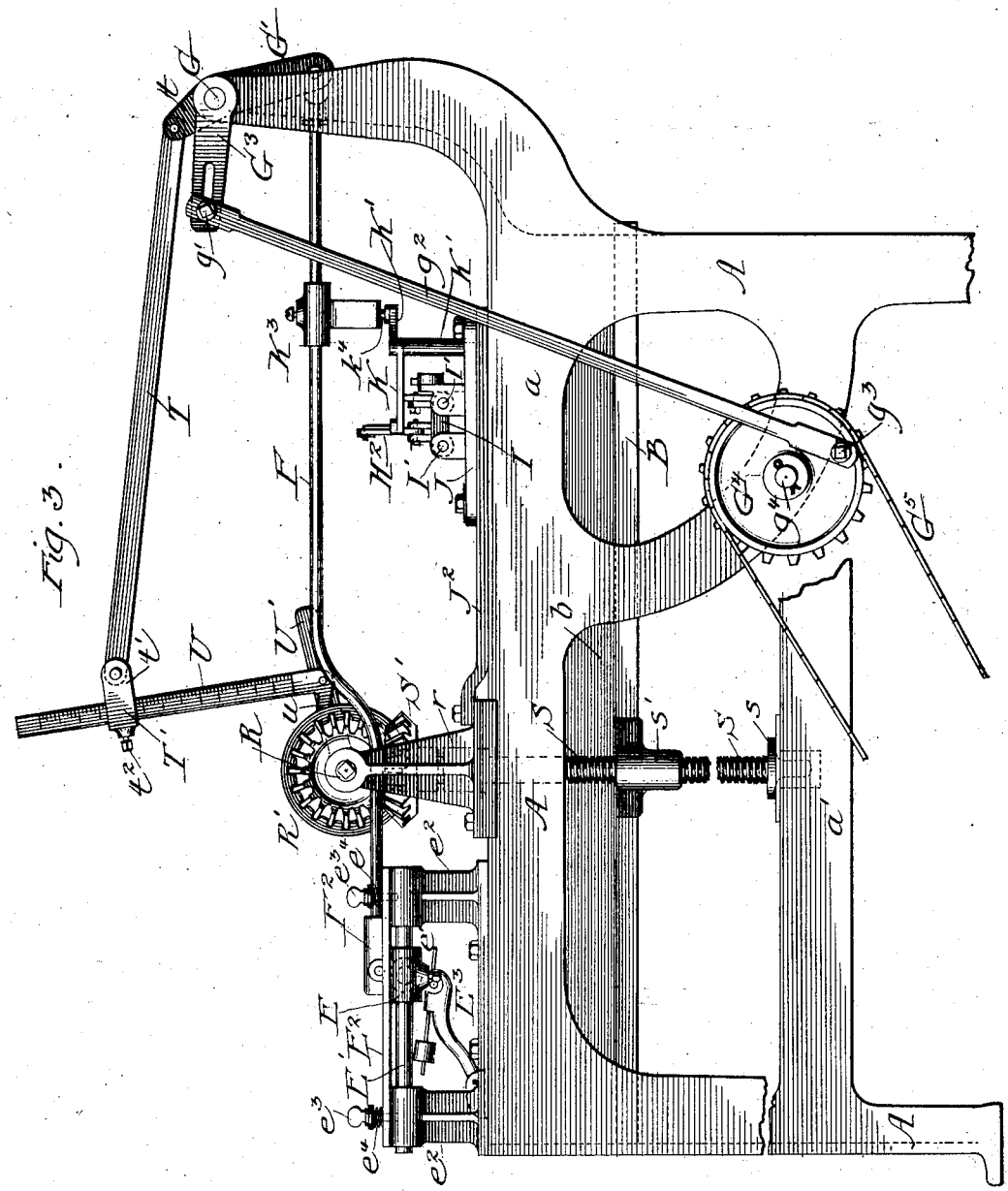

No. 761,669. PATENTED JUNE 7, 1904.
A. B. GRAHAM.
SHEET DELIVERY MECHANISM.
APPLICATION FILED JUNE 11, 1900.
NO MODEL. 6 SHEETS—SHEET 4.
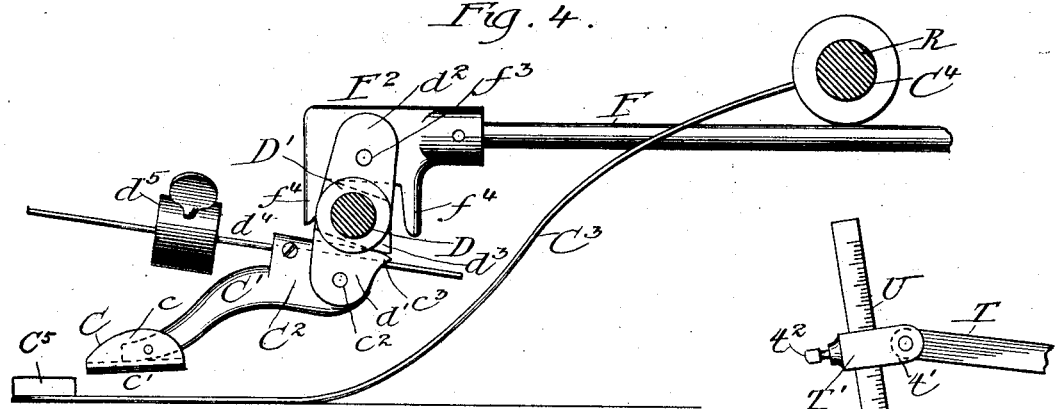
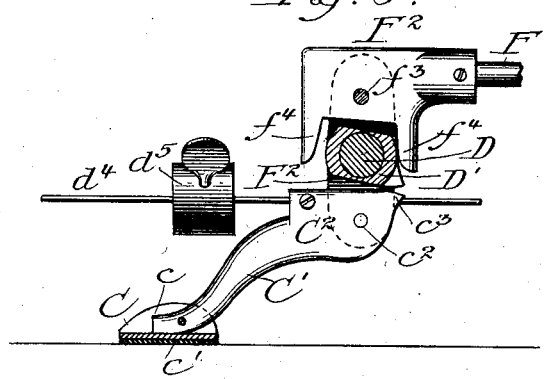
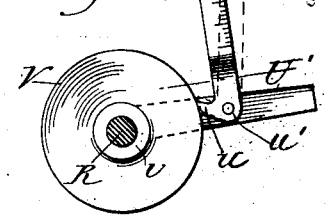
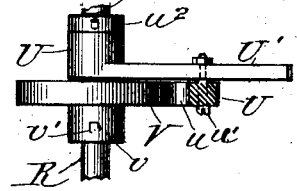
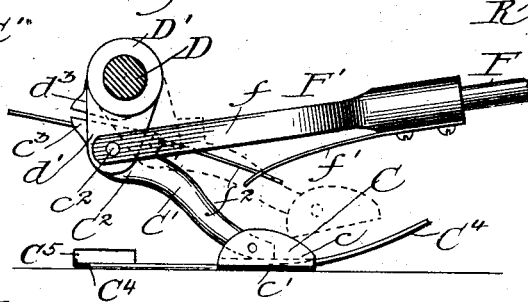
Witnesses:
Frank S. Blanchard
Harold S. Barrett
Inventor:
Alvaro B. Graham
By Banning & Banning,
Attorneys.

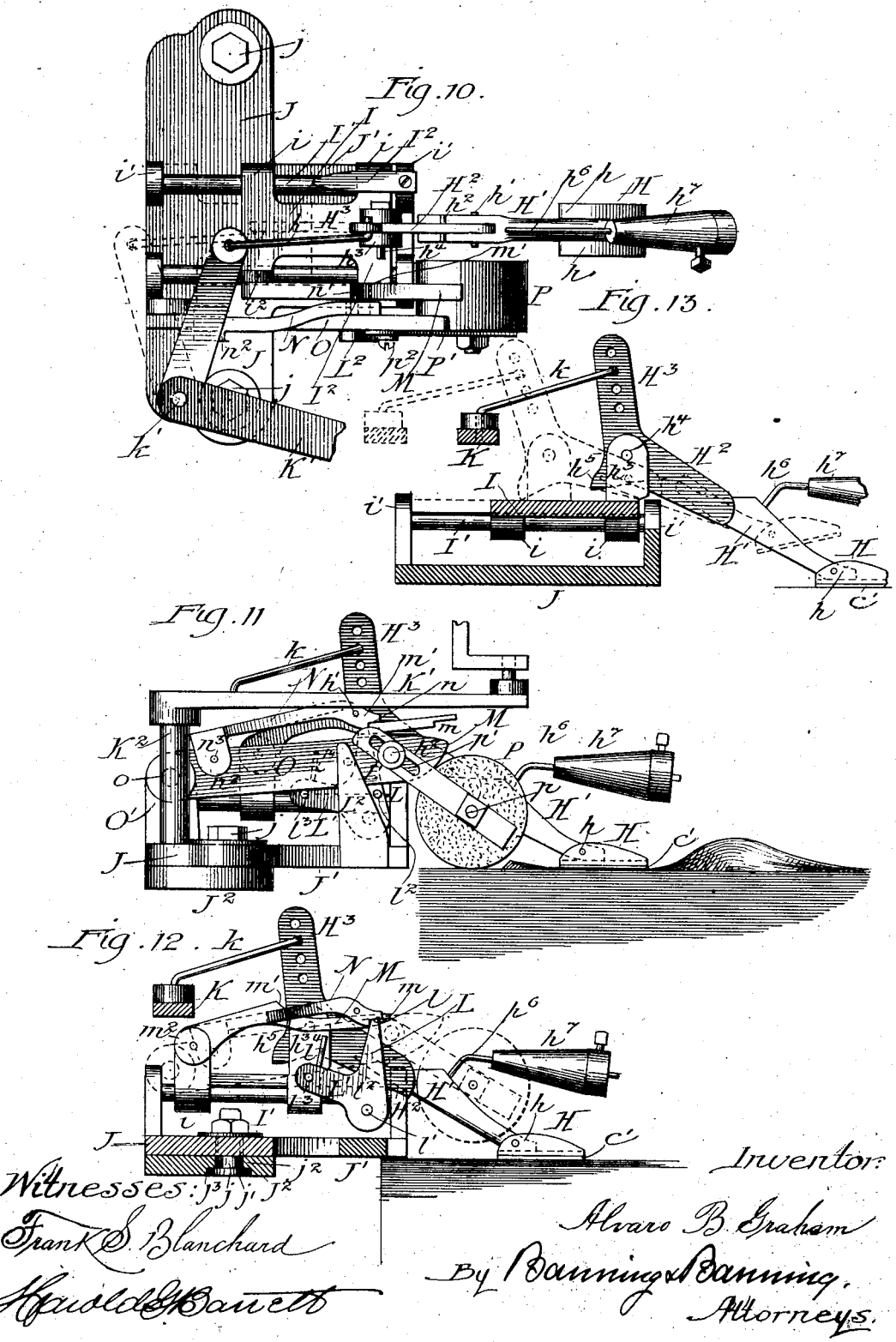

No. 761,669. PATENTED JUNE 7, 1904.
A. B. GRAHAM.
SHEET DELIVERY MECHANISM.
APPLICATION FILED JUNE 11, 1900.
NO MODEL. 6 SHEETS—SHEET 6.

Witnesses: Inventor:
Frank S. Blanchard Alvaro B. Graham
Harold S. Boutto By Banning & Banning.
Attorneys.

No. 761,669.                                        Patented June 7, 1904.

UNITED STATES PATENT OFFICE.

ALVARO B. GRAHAM, OF CHICAGO, ILLINOIS, ASSIGNOR TO THE GRAHAM PRESS FEEDING COMPANY, A CORPORATION OF ILLINOIS.

SHEET-DELIVERY MECHANISM.

SPECIFICATION forming part of Letters Patent No. 761,669, dated June 7, 1904.

Application filed June 11, 1900. Serial No. 19,806. (No model.)

*To all whom it may concern:*

Be it known that I, ALVARO B. GRAHAM, a citizen of the United States, residing at Chicago, in the county of Cook and State of Illinois, have invented a new and useful Improvement in Sheet-Delivery Mechanism, of which the following is a specification.

The object of the invention is to provide mechanism for delivering or feeding paper from a pile or stack to a printing-press, folding-machine, or other appliance; and the invention consists in the features and details of construction and the combination of parts hereinafter described and claimed.

Figure 1:
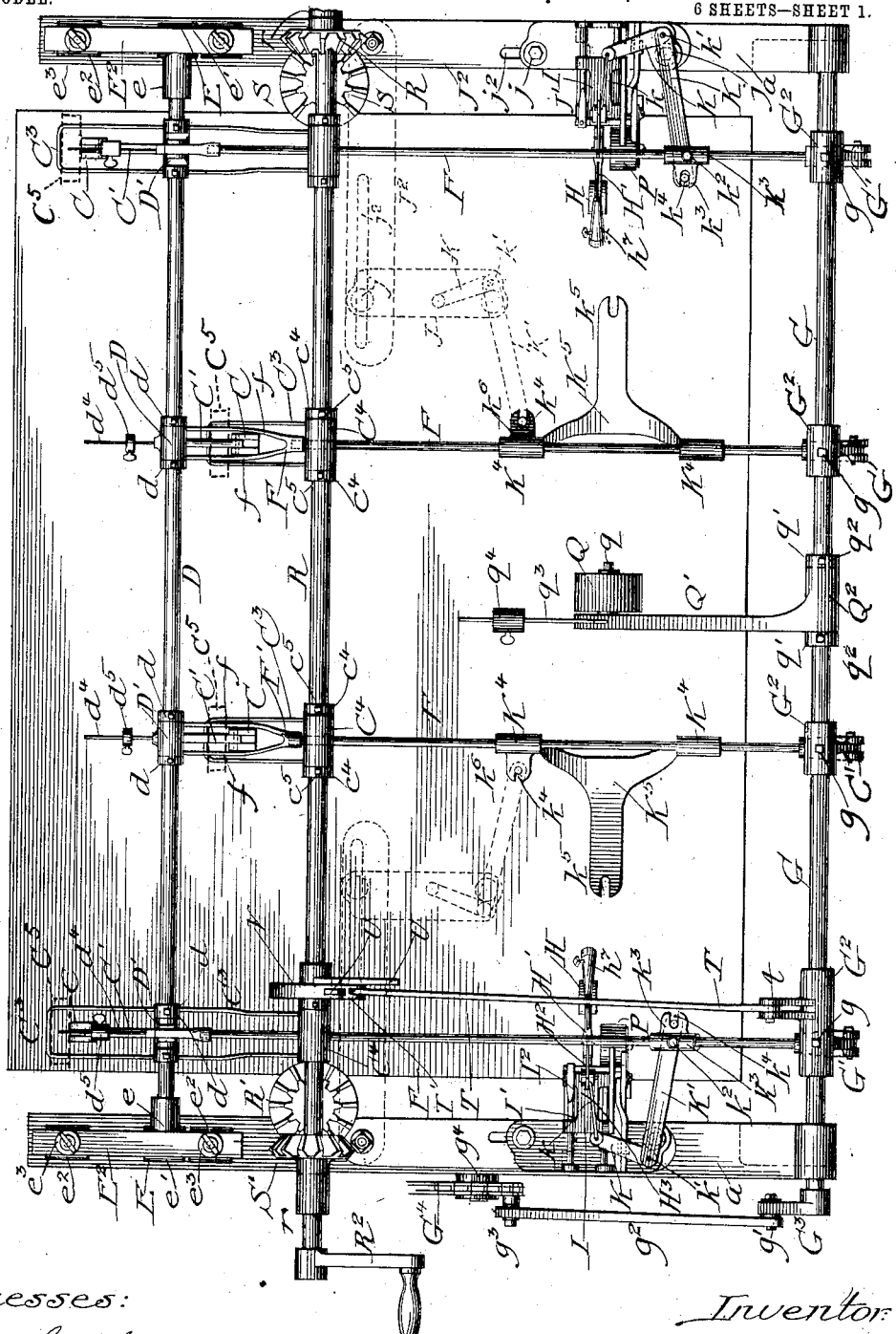
Figure 14:
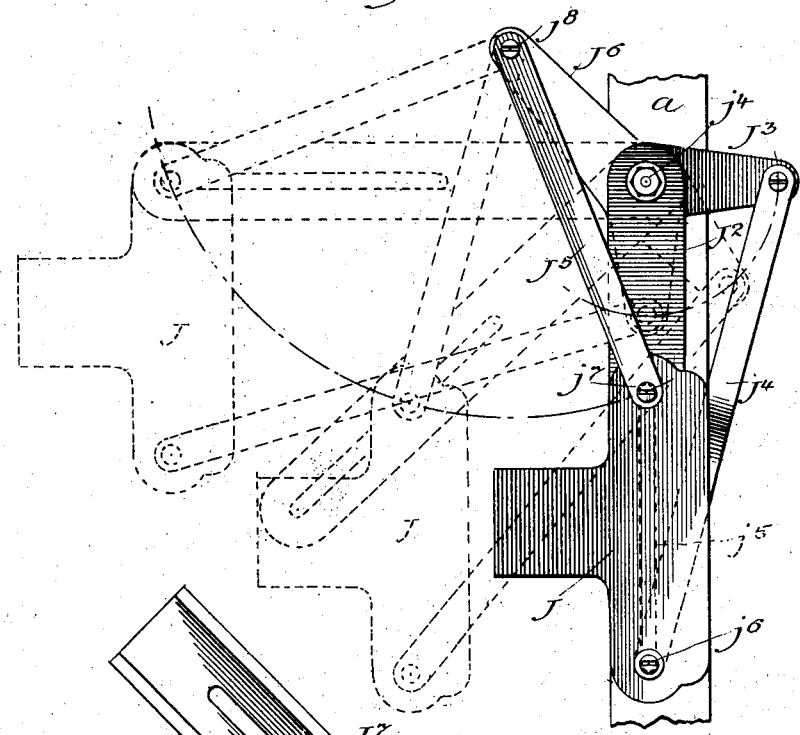
Figure 15:
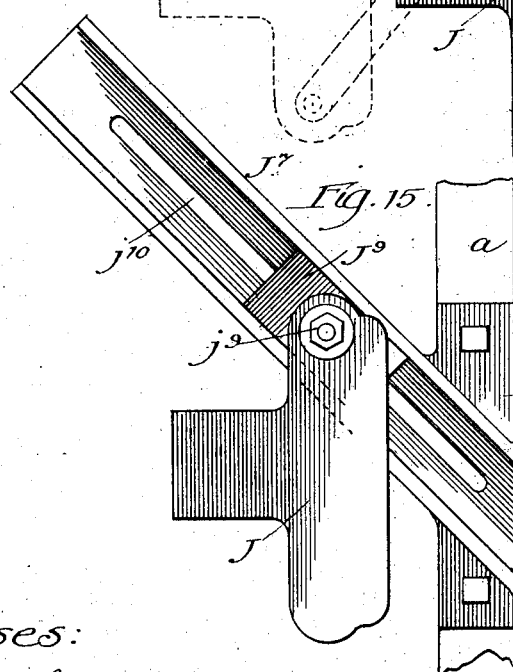

In the drawings, Figure 1 is a top or plan view of the sheet-delivering mechanism of the present invention. Fig. 2 is a rear elevation of the same. Fig. 3 is a side elevation of the same, Figs. 2 and 3 having the frame broken away; Fig. 4, a detail, partly in section, showing one of the forward presser-feet and its operating devices; Fig. 5, a detail, partly in section, of the presser-foot and its operating device shown in Fig. 4; Fig. 6, a detail, partly in section, showing a modification in the operating devices for the front presser-feet; Fig. 7, a detail showing a presser-foot having its cushion or pad in the form of a tube or cot encircling the foot; Fig. 8, a detail, partly in section, being a side elevation of the feed-disk and its friction feeding pawl or dog; Fig. 9, a detail, partly in section, being a top or plan view of the parts shown in Fig. 8; Fig. 10, a top or plan view of one of the side presser or corner-raising feet for the sheet at the rear corners; Fig. 11, a detail, being a side elevation of the parts shown in Fig. 10; Fig. 12, a detail, partly in section, of the parts shown in Fig. 10; Fig. 13, a detail, also partly in section, of some of the parts shown in Fig. 10; Fig. 14, a detail, being a top or plan view of a modified form of the carrier or support for the side presser or corner-sheet-raising feet; Fig. 15, a detail, being a top or plan view of another modification of the carrier or support for the side presser or corner-sheet-raising feet.

The machine has a framework A of any suitable construction, on which to mount the delivery mechanism proper and in which to locate a sheet-raising platform or table B, on which is placed the pile of sheets to be operated upon and delivered by the sheet-delivery mechanism. At the front or delivery end of the machine are located the front or delivery presser-feet C. Each foot C is formed with a plate or base with upwardly-projecting ears $c$, and the plate or base is provided with a cushion or pad $c'$, of rubber or other suitable material that will clasp or hug the sheet closely, so as to insure the forward movement of the foot, carrying with it the clasped or caught sheet. The cushion or pad $c'$ in the construction shown in Fig. 7 is in the shape of a tube or cot to fit over the foot, so that as the bearing-face becomes worn and will not act effectively the tube or cot can be turned to bring a new portion thereof in position to act as the cushion or pad. As shown in the other figures of the drawings, the cushion or pad is flat and secured to the bottom of the foot. Each presser-foot is pivotally mounted at the forward end of a leg or support $C'$, having at its rear end a knee or head $C^2$ for pivotally connecting it so that it is free to adjust itself on its own pivot to suit the lay or conformation of the pile of paper and so as to be raised and lowered on the pivot of the knee or head with the receding and advancing movements given thereto.

A shaft D extends across the frame from side to side and has loosely mounted thereon sleeves or sockets $D'$, each sleeve or socket being held against end movement by collars $d$, abutting against the ends of the sleeve or socket, and each locked to the shaft by a set-screw or otherwise. As shown in Fig. 6, each socket $D'$ has a depending ear or projection $d'$, to which is pivoted the knee or head $C^2$ by a suitable pin or pivot $c^2$ to permit the leg or support $C'$ to be raised and lowered at its front end to raise and lower the presser-foot. Each sleeve or socket $D'$ has a lug or stop $d^3$, which, with the movement of the socket, contacts a lug or stop $c^3$ on the knee or head $C^2$ when the ear or arm $d'$ is moved backward, such contact operating to raise the presser-foot, while with the forward movement of the ear or arm the contact between the lugs or stops is broken, permitting the foot to drop and act on the first or top sheet of paper.

Each end of the shaft D enters a socket $e$ of a slide E, the body $e'$ of which is mounted on a rod $E'$, supported in standards or uprights $e^2$ from a base or plate $E^3$, adjustably secured to the top rail $a$ of the frame by suitable clamping-bolts or otherwise. A friction or bearing plate $E^2$ is supported on the tops of the standards or uprights $e^2$ and held in place by means of tightening screws or bolts $e^3$, and between the head of each screw or bolt and the face of the plate is a pressure-spring $e^4$, permitting an adjustment by means of which the plate can be made to bear or press against the top or upper face of the body of the slide E and create a friction between the slide and the rod on which it is mounted. This friction between the slide and its rod operates to momentarily resist the return movement of the slide, thereby insuring a quick raising of the presser-feet by the reciprocating rods through which the feet are actuated and also preventing the feet from dropping when raised and on the return movement. Each front or delivery foot is moved through the medium of a reciprocating rod or pitman F, operated from a rock-shaft. As shown in Figs. 1, 2, and 6, the forward end of each reciprocating rod or pitman has secured thereto a fork $F'$, having arms $f$, which receive between them the ear or arm $d'$ of the sleeve or hub $D'$, for the fork, the ear, and the leg of the presser-foot to be united by the same pivot $e^2$ on which the leg of the presser-foot is pivotally mounted. The pressure on the foot when down is secured by a flat spring $f'$, as shown in Figs. 2 and 6, through the end of which a rod $f^2$ on the head of the leg or standard passes, the rod and spring being adjustable in their relation to each other to regulate the pressure, for which purpose both rod and spring have a downward curvature, and the rod is movable endwise to give different points of bearing on the spring, so that the action of the spring will be to press down on the rod and force and hold the foot in engagement with the paper sufficiently strong to have the advance of the foot carry with it the sheet of paper. The downward pressure is maintained during the forward movement of the reciprocating rod or pitman, which gives a corresponding movement to the foot, and on the return or backward movement of the pitman the sleeve or hub is turned to contact the lugs or stops $c^3$ and $d^3$ and raise the foot, as already described, against the force of the spring.

As shown in Figs. 3, 4, and 5, each reciprocating rod or pitman F has secured to its front end a head or block $F^2$, and the sleeve or hub $D'$ has upwardly-projecting ears $d^2$, between which the head or block is pivoted by a suitable pin or pivot $f^3$. The head or block has at each end on the bottom a depending lug or projection $f^4$, which form stops to limit the independent swing of the sleeve or hub. As shown, the sleeve or hub between the ears is cut away on the top and bottom to leave a flat face; but, if desired, the sleeve or hub could have an entire round periphery. The foot is raised with the rearward movement of the rod or pitman, which causes the sleeve or hub to contact the lugs or stops $c^3$ and $d^3$ and lift the foot, and, as shown in Figs. 1, 3, 4, and 5, the pressure to hold the foot in engagement when advancing is furnished by a weight $d^5$ on a rod $d^4$, carried by the knee or head of the leg or standard. The rod may be adjustably secured in the knee or head or be fixed therein. The weight is to be adjustably mounted on the rod so as to change its location as required to produce the proper amount of pressure or force for the foot to engage and slide or move the sheet of paper forward. The paper adjacent to each presser-foot is held straight and smooth by a loop $C^3$, extending around each foot and carried by a collar $C^4$, loosely mounted on the feed-shaft and held against endwise movement on the shaft by collars $c^4$ at each end of the socket or sleeve and a set-screw $c^5$ for each collar. The loop is of sufficient dimensions to bear on the paper adjacent to the presser-foot and is of a length sufficient to permit the forward and backward movement of the foot and its leg or support without coming in contact with the loop. The pressure for keeping the loop on the paper may be supplied by a loose weight $C^5$, placed on the top of the side bars of the loop, as shown by the dotted lines in Figs. 1 and 2 and the full lines in Figs. 4 and 6, the weight being changed as may be required for the necessary force to hold the sheet smooth around the foot.

The rock-shaft G for reciprocating the rods or pitmen F is mounted in suitable journal boxes or bearings on the side pieces of the frame at the rear of the machine and carries a corresponding number of arms or levers $G'$ to the number of the rods or pitmen, each pitman or rod being pivotally attached to its arm or lever. Each arm or lever is on a socket or sleeve $G^2$, which can be locked to the rock-shaft by a set-screw $g$ or otherwise. The rock-shaft at one end has an arm or crank $G^3$ with a wrist-pin $g'$, having connected therewith a pitman or rod $g^2$, connected with a wrist-pin $g^3$ on a sprocket or other driving wheel $G^4$, mounted on a journal pin or spindle $g^4$ on the side piece of the frame, so that the rotation of the driving-wheel operates the pitman or rod and rocks the shaft G to reciprocate the rods or pitmen F to rock the sleeves or hubs and move all the presser-feet simultaneously.

A presser or corner-sheet-raising foot H is located on each side of the machine near the rear end of the platform or table. Each foot has on its under face a cushion or pad $c'$, the same as the front presser-feet, and has ears $h$ on its upper face, between which is pivoted a leg or support $H'$, pivoted to the arm $H^2$ of a vertical L-lever by a suitable pin or pivot $h'$, and, as shown, the foot or leg is forked to straddle the end of the arm $H^2$, and the arm is provided with a projecting pin $h^2$, which forms a stop for engaging the fork of the leg or support to raise the leg or support and limit its descent. The L-lever is pivotally mounted on a pin or pivot $h^4$ between ears $h^3$ on a slide I and has a stop $h^5$ to limit the upward movement of its arm $H^2$ and the presser-foot. The slide I is mounted on rods $I'$ so as to be free to move back and forth by eyes $i$, encircling the rods, which are secured in uprights or standards $i'$ on a plate J and an inward extension $J'$ of such plate. A flat bearing-spring $I^2$ is secured to one of the uprights or standards and extends across one of the ears of the slide and has sufficient force or pressure to bear or press on the slide and create a friction between the slide and its rods on which it is mounted for the friction to operate and resist the movements of the slide and hold the foot from dropping when raised on the return movement from the action of its pressure-weight. The plate J is mounted on a base-plate $J^2$ and is clamped to such plate by bolts $j$ and is adjustable forward and back thereon by means of a slot $j^2$ in the base-plate, through which slot the clamping-bolts pass, each clamping-bolt having a head $j'$ entering a groove or recess $j^2$ on the under face of the base-plate, so as to permit the adjustment of the carrying-plate and the locking of such plate in its adjusted position by means of the clamping-bolts.

The arm $H^3$ of the vertical L-lever is connected by a rod $k$ with the arm K of a horizontal L-lever mounted on a post or standard $K^2$ by a pin or pivot $k'$, so as to permit of the swinging or oscillating of the L-lever in a horizontal plane. The other arm, $K'$, of the horizontal L-lever is connected with a sleeve or hub $K^3$, (shown in fullness in Fig. 1,) fixed to the outer reciprocating rod or pitman F by a set-screw $k^2$, and the sleeve or hub has a projecting ear $k^3$, slotted to receive a pin or stud $k^4$ on the end of the lever-arm $K'$, so that with the forward and backward movement of the rod or pitman the horizontal L-lever will be swung on its pin or pivot and, through the connecting-rod $k$, move the vertical L-lever having the arm $H^2$ and $H^3$ for that lever to actuate the leg or support of the presser-foot and raise and lower the foot. The pressure or force for holding the foot in engagement or contact with the paper is furnished by a sliding weight $h^7$, adjustable on a rod $h^6$, extending out from the leg or support, so that the weight can be moved on the rod as required for the pressure needed, and when properly adjusted the weight is locked to the rod by a set-screw or otherwise.

The slide or socket $K^3$ is for use with paper of the greatest width and would not be adapted for use with paper of narrower width, as the presser-foot would operate outside of the edge of the sheet. The side presser or corner-lifting feet can be brought into position to operate on narrow sheets of paper of different widths by swinging the base-plate $J^2$ inward and adjusting the carrying-plate J thereon through the clamping-bolt and slot, with the carrying-plate at right angles to the base-plate and parallel with the side rails or pieces of the frame, as shown by the dotted line in Fig. 1. This change in the location of the base-plate necessitates a change for the attachment of the operating parts of the foot to the slide-rod, requiring a connection with an intermediate slide-rod. Such connection is had through the support furnished by the slides or sockets $K^4$ and connecting-bar $K^5$. The connecting-bar $K^5$ has an elongated ear $k^5$, terminating in a slot to receive the stud or pin $k^4$ on the arm $K'$ of the horizontal lever for medium-width paper, and one of the sockets or sleeves $K^4$ has an ear $k^6$ with a slot to receive the pin $k^4$ on the arm $K'$ of the horizontal lever, so that by the connection of the horizontal lever with either of the ears $k^5$ or $k^6$ the movement of the support will operate the horizontal and vertical L-levers to raise and lower the foot, as already described.

The corner of the sheet should be free at the initial inward movement of the presser-foot, so as to enable the foot to raise and free the rear end of the top sheet at each corner, and at the same time after the corner is clear of the pile of sheets or has been raised the corners of the pile of sheets must be held so as to prevent the advance of the forward presser-feet from carrying more than the one sheet which has been raised at the corners forward for delivering.

The inward extension or neck $J'$ of the plate J has mounted thereon a vertical L-lever pivoted to an upward support $L^2$ by a suitable pin or pivot $l'$. One arm, L, of this lever terminates in an end $l$, and the other arm, $L'$, carries a lateral pin $l^3$ and a vertical pin $l^4$, and just above the pivot of the lever is a lateral pin $l^2$, which forms a stop against a too-far return or backward throw of the lever by engaging the edge of the upright or support $L^2$. A dog or latch M is pivoted to an ear $m^2$ on the slide I, and its forward end has an undercut forming a notch or recess $m$ to engage with the upper end $l$ of the vertical arm L of the lever, and its upper face has an incline $m'$ rearward of its forward end. A second dog or latch N is pivoted to a bar O, mounted on an ear or standard $O'$ by a pin or pivot $o$, so that the bar O is free to rise and fall at its forward end. The latch N is mounted by ears $n^2$ and a pin or pivot $n^3$ and is free to rise and fall independent of the bar. The forward end of the dog or latch is undercut to have a recess or notch $n$ to engage with the end $l$ of the upright arm L of the lever when such arm L is in its advanced or forward position. The dog or latch N has a lateral projecting pin $n'$ to be engaged by the incline $m'$ of the dog or latch M, with the continued advance of the dog or latch M, so as to raise the forward end of the dog or latch N from engagement with the vertical arm L and permit the L-lever to be returned or carried back. The upper end $l$ of the upright arm L is wide enough for engagement by the forward ends of both the levers M and N. The engagement of the forward end of the dog or latch M with the arm L swings the L-lever forward, causing the pin $l^3$ on the arm L' to raise the bar O at its forward or free end, and such movement will continue until the under face of the dog or latch M is contacted by the upper end of the pin $l^4$, so as to raise the dog or latch M and disengage the end thereof from the arm L, at which time the upper end of the arm L has passed to a point where the dog or latch N can drop behind the end $l$ of the arm L and hold the lever against a return movement with the forward end of the bar O in its elevated or raised position. The bar will be held at its forward end in a raised position until the farther advance of the dog or latch M causes the incline $m'$ to contact the pin $n'$ and raise the dog or latch N from engagement with the arm L, leaving the L-lever free to swing back and permit the forward end of the bar O to drop or descend.

A bar O is provided for each of the side presser or corner-sheet-raising feet. Each bar has connected therewith a weight P, secured by a bolt $p$ to an arm or bar P', attached to the forward end of the arm O by means of a slot $p'$ in the bar P' and a clamping-bolt $p^2$ on the bar O, the slot and clamping-bolt permitting of an adjustment as required to properly locate the weight in relation to the rear corners of the pile of paper. It is necessary that the sheets at the rear corners should be loose at the initial forward movement of the side presser-feet in order to permit said feet to raise and release the rear corners of the sheet for the withdrawal of the top sheet; but during such withdrawal the pile of sheets must be held or retained in order to prevent the moving or delivering of more than the top sheet. This retaining of the rear corners of all of the sheets except the top one is secured by the drop-weights P, which are temporarily raised with the initial advance of the side presser-feet by the raising of the forward end of the bar O from the initial advance of the slide I through the dog or latch M and the lever having the arms L and L', as already described. Each weight will be held in its raised position during the advance of the side presser-feet and until the dog or latch M has advanced sufficiently far for the incline thereon to lift each dog or latch N, releasing the arms L, so that the weights will drop, carrying with them the bars O for the weights to rest on the pile of sheets at the rear corners and hold the sheets against being drawn forward with the forward movement of the front or delivery feet and during the return movement of the side presser or corner-sheet-lifting feet, so that during the entire movement all the sheets except the upper one are held against forward movement during the action of the front or delivery presser-feet.

The rear end of the pile of sheets is held down at the center during the operation of feeding the sheets forward at all times by a roller Q, carried by a journal pin or stud $q$ on an arm Q', extending out from a socket or sleeve $Q^2$, loosely mounted on the rock-shaft Q and held against endwise movement on the shaft by collars $q'$ and set-screws $q^2$. The pressure for holding the sheets against upward lift and forward movement is furnished by a weight $q^4$, adjustable on a rod $q^3$, projecting out from the arm or support Q'. The weight can be adjusted forward or back on the rod so as to give the required pressure on the sheets to hold them and at the same time allow the withdrawal of the upper sheet without affecting the remaining sheets, such withdrawal being permitted by the roller revolving on its journal pin or stud with the forward movement of the top sheet.

The feed-shaft R is mounted in suitable supports $r$ on each side of the machine, and on this shaft is loosely mounted the retaining-loops $C^3$, as already described. The upper end of each shaft has a miter-gear R', which meshes with a miter-gear S' on a vertical shaft S, each shaft S being stepped or supported in a bracket $s$ or other suitable support on a bar $a'$ of the frame A. Each vertical shaft is screw-threaded on its exterior and passes through a screw-threaded nut or socket $s'$ on the platform or feed-board B, so that with the rotation of the shafts in one direction the feed-board will be gradually raised, while with the rotation of the shafts in the opposite direction the platform or feed-board will be lowered. The feed-board when lowered can be supplied with the required amount of paper sheets, which sheets are to be delivered one by one from the top by the operation of the sheet-delivery devices already described. It is necessary in order to have a proper delivery of each top sheet that the platform or feed-board be raised gradually and to the extent only commensurate with the delivery of a sheet, and for this purpose the feed-shaft R should be given a partial revolution sufficient to rotate the vertical shafts to raise the platform or feed-table, and such raising should occur as each sheet is delivered. The rotation of the feed-shaft should therefore be in unison with the advance movement of the front or delivery presser-feet. This movement is had by the following devices:

A rod or pitman T is pivoted at its rear end to an arm or lever $t$ on the socket or sleeve $A^2$ of a rod or pitman F and at its forward end is pivoted between the ears $t'$ on a sliding block or head T', which moves on a graduated arm or lever U, carrying an engaging pawl $u$ permanent with the arm or lever. The arm or lever U is pivotally connected with an arm or bar U' by a suitable pin or pivot $u'$, and the arm or bar U' extends out from a socket or sleeve $U^2$, loosely mounted on the feed-shaft R and held against end movement in one direction by a collar $u^2$, locked to the shaft by a set-screw $u^3$. A friction-disk V is located on the shaft R adjacent to the socket or sleeve $U^2$ to be in line with the engaging end of the pawl $u$ and is provided with a center or hub $v$, fastened to the shaft by a set-screw $v'$, so that with the forward rotation of the friction-disk the feed-shaft will be forwardly rotated. The degree of rotation of the feed-shaft should be one to raise the platform or feed-table the thickness of a sheet of paper, and in order to secure this result the arm or lever of the friction-pawl is provided with a graduated scale by means of which the slide or clasp T' can be adjusted up or down, as required, for the throw of the pawl to operate the friction-disk, and when adjusted the slide or clasp can be locked in its adjusted position by a set-screw $t^2$ or otherwise. The location of the slide or clasp near the pivot produces a greater movement of the arm or lever and a corresponding greater movement of the friction-pawl, giving a greater rotation to the friction-disk. A farther outward adjustment of the slide on the arm or lever gives a smaller swing and a smaller movement of the friction-pawl, producing a less rotation of the friction-disk. It will thus be seen that with the adjustment of the slide or clasp inward or toward the pivot-point of the lever the friction-disk will rotate the shaft for a thick sheet and the outward adjustment of the slide or clasp gives the pawl a movement to partially rotate the shaft for thinner sheets of paper. This arrangement enables a feed to be had to suit the thickness of the sheet of paper, and instead of having the slide and scale on the pawl arm or lever they could be on a suitable arm or lever on the rock-shaft.

In Fig. 14 a modified construction for moving the side presser or corner-sheet-raising feet is shown. The lower plate $J^2$ has a side extension or arm $J^3$ and is pivoted at $j^4$ to the top rail $a$ of the side of the frame. A link $J^4$ is pivoted to the end of the arm or extension $J^3$ and at its other end is connected by a pin or pivot $j^6$ with the base-plate J. The lower plate $J^2$ has a longitudinal slot $j^5$, in which plays a pin $j^7$ on an arm $J^5$, which pin passes through the base-plate J. The other end of the link, $J^5$, is pivoted by a pin or pivot $j^8$ to a fixed arm or bracket $J^6$, extending inward from the top rail of the frame. The turning of the lower plate on its pivot $j^4$ causes the arm or extension $J^3$ to move the link $J^4$, and such movement of the link carries the base-plate J inward, and in such inward movement the base-plate J is carried in planes parallel with the side of the frame by the action of the links $J^4$ and $J^5$, through which it is supported and carried. The base-plate can be carried to any intermediate or middle position or to its farthest inward position, as shown by the dotted line in Fig. 14, and from any adjusted position connection can be made with the sliding support on the intermediate rod or pitman, as already described, and thus provision is made for different widths of paper.

Another modification of a support for the side presser or corner-sheet-lifting feet is shown in Fig. 15, in which a diagonal plate $J^7$ is attached by a plate $J^8$ to the top rail $a$ of the frame. The inclined plate has on its upper face a channel in which is located a sliding block $J^9$, to which is attached by a bolt $j^9$ the base-plate J, the stem of the bolt passing through a slot $j^{10}$ in the body of the plate $J^7$. The loosening of the bolt $j^9$ permits the sliding block to be moved inwardly in its channel on the plate $J^7$, so that the base-plate J can be adjusted to any intermediate or to its farthest inward position, and when the adjustment is reached the tightening of the clamping-bolt $j^9$ securely holds the base-plate in its adjusted position. The connection of the operating parts of the side presser-feet is made with the plate J in its adjusted positions for Fig. 15 the same as with the adjusted positions of Fig. 1.

The mechanism is to be located in proper relation to a printing-press, a folder, or any intermediate or other form of receiving or delivery appliance, so as to operate and deliver a pile of paper, sheet by sheet, to the press, folder, or delivery appliance. The parts are so timed that when the rear corner-retaining weights are raised the side presser or corner-sheet-raising feet move inward to lift the corners of the sheet, at which time the front or delivery presser-feet are in their elevated position and on their return movement. As the sheet-corners are carried inward the weights are in their raised position and so remain until the finish of the movement to raise the corners, when they drop onto the pile of sheets and hold them against the forward movement of the front or delivery presser-feet to slip or move the top sheet bodily forward, which movement of the front or delivery presser-feet begins with the termination of the inward movement of the side presser or corner-raising feet. It will thus be seen that the rear ends of the pile of sheets are held against movement of any sheet except the top one, that the top sheet is left free and clear to be carried forward with the forward movement of the front or delivery feet, and that the movements of the feet alternate, one set being in operation when the other set is non-operative.

The friction-feed enables the platform or feed-board to be accurately raised proportionately to the thickness of a sheet, as the slide which operates the friction pawl or lever can be adjusted up or down thereon to suit the requirements of the thickness of a sheet and have the forward movement of the friction-disk rotate the feed-shaft to the degree required for raising the table or platform the distance of the thickness of one sheet with the delivery of each sheet. The friction-feed produced by the operation of an arm or lever and a pawl integral therewith or fixed rigid or permanent thereon operating in conjunction with a feed disk or face can be successfully utilized wherever it is requisite or necessary to have a positive graduated feed of the same degree at each operation.

The weighted loops around the front or delivery presser-feet operate to hold the sheet against crinkling or draw in the operation of the feet, and by turning the intermediate feet rearwardly, as shown in Fig. 1, the sheet will be maintained in a straight-line travel, as any advance from the operation of a corner-foot that would tend to turn the sheet is overcome by the pressure or action of the intermediate feet. The friction produced by the bearing-bars E and by the bearing-springs $I^2$ is to be adjusted in each case so as to produce the slight resistance required for the operation of the feet at the terminus of movement in either direction and to hold the feet when raised against dropping from the action of the pressure springs or weights. The presser-foot is preferably pivotally attached to its leg or support; but a foot formed with the leg or support or rigidly secured thereto can be used, if desired, the foot in either case to have a reciprocating movement and to be raised clear of the sheets on the return movement and to be engaged with the top sheet on the advance or forward movement to deliver the sheet.

I claim—

1. In a sheet-delivery mechanism, presser-feet at the delivery end of the mechanism, a leg or support for each foot having the foot at its forward end, a rocking sleeve or hub for each leg or support having the leg or support pivoted thereto, contacts between the head or knee of each leg or support and its rocking sleeve or hub for raising the leg and permitting it to fall, and actuating means operating to rock the sleeves or hubs and through the sleeves or hubs raise and lower the legs or supports and the presser-feet, substantially as described.

2. In a sheet-delivery mechanism, presser-feet at the delivery end of the mechanism, a leg or support for each foot having the foot at its forward end, a rocking sleeve or hub for each leg or support having the leg or support pivoted thereto, contacts between the head or knee of each leg or support and its rocking sleeve or hub for raising the leg, pressure means for forcing the leg or support down and holding the presser-foot in engagement with the paper and actuating means operating to rock the sleeves or hubs and through the sleeves or hubs raise and lower the legs or supports and the presser-feet, substantially as described.

3. In a sheet-delivery mechanism, presser-feet at the delivery end of the mechanism, a leg or support for each foot having the foot at its forward end, a rocking sleeve or hub for each leg or support having the leg or support pivoted thereto, contacts between the head or knee of each leg or support and a rocking sleeve or hub for raising the leg, a rod carried by each leg or support, a presser-spring acting on each rod to force the leg of the foot down and hold the foot in engagement with the paper, and actuating means operating to rock the sleeves or hubs and through the sleeves or hubs raise the legs or supports and the presser-feet, substantially as described.

4. In a sheet-delivery mechanism, presser-feet at the delivery end of the mechanism, a leg or support for each foot having the foot at its forward end, a rocking sleeve or hub for each leg or support having a leg or support pivoted thereto, contacts between the head or knee for each leg or support and its rocking sleeve or hub for raising the leg, an adjustable weight carried by each leg for forcing the leg down and holding the foot in engagement with the paper, and actuating means operating to rock the sleeves or hubs and through the sleeves or hubs raise the legs or supports and the presser-feet, substantially as described.

5. In a sheet-delivery mechanism, side presser-feet at the rear end of the mechanism, a leg or support for each foot having the foot at its inner end, a vertical oscillating or rocking L-lever for each leg or support having the leg or support pivoted to one arm thereof, a contact between the leg or support and the arm of the L-lever for raising the leg or support and permitting it to fall, and actuating means operating to rock or oscillate the L-levers and raise and lower the legs or supports and the presser-feet, substantially as described.

6. In a sheet-delivery mechanism, presser-feet at the rear end of the mechanism, a leg or support for each foot having the foot at its forward end, a vertical oscillating or rocking L-lever for each leg or support having the leg or support pivoted to one arm thereof, a slide carrying the vertical oscillating or rocking L-lever, and means for reciprocating the slides to oscillate or rock the L-levers to raise and lower the legs or supports and the presser-feet, substantially as described.

7. In a sheet-delivery mechanism, presser-feet at the delivery end of the mechanism, a leg or support for each foot having the foot at its forward end, a rocking sleeve or hub for each leg or support having the leg or support pivoted thereto, contacts between the head or knee on each leg or support and a rocking sleeve or hub for raising the leg, side presser-feet at the rear end of the mechanism, a leg or support for each side presser-foot having the foot at its inner end, a vertical oscillating or rocking L-lever for each leg or support having the leg or support pivoted to one arm thereof, a contact between the arm of the L-lever and its leg or support for raising the leg or support, and separate means actuated from a common motive power for operating the sleeves or hubs and for operating the vertical oscillating or rocking L-levers to have the rocking movement of each commence on the cessation of the rocking movement of the other and giving the feet reciprocating movements by the continued action in the same direction of the actuating means, substantially as described.

8. In a sheet-delivery mechanism, side presser-feet at the rear end of the mechanism, a leg or support for each foot having the foot at its inner end, a vertical oscillating or rocking L-lever for each leg or support having the leg or support pivoted thereto, a contact between the leg or support and the arm of its vertical oscillating or rocking L-lever for raising the leg or support, a slide having the vertical oscillating or rocking L-lever pivotally mounted thereon, a horizontal oscillating or rocking lever connected with the other arm of the vertical lever, to oscillate or rock the vertical levers and raise the feet on the return movement and to advance the feet when lowered into operating position, and means for oscillating the rocking or horizontal levers, substantially as described.

9. In a sheet-delivery mechanism, the combination of side presser-feet at the rear end of the mechanism, a leg or support for each foot having the foot at its inner end, a vertical oscillating or rocking L-lever for each leg or support having the leg or support pivoted to an arm thereof, a contact between the leg or support and its arm of the vertical oscillating or rocking L-lever, a slide on which the vertical L-lever is pivotally mounted, a horizontal oscillating or rocking L-lever connected with the other arm of the vertical L-lever to oscillate or rock the vertical lever and raise the feet on the return movement, and to advance the feet when lowered into operating position, a reciprocating support or sleeve having one arm of the horizontal L-lever connected therewith, and means for reciprocating the supports or sleeves to cause the horizontal L-levers to operate the vertical L-levers and raise the presser-feet, substantially as described.

10. In a sheet-delivery mechanism, the combination of a retaining-weight, one on each side at the rear end of the mechanism, a swinging bar for each weight pivotally mounted at its rear end, a vertical L-lever for each bar having one of its arms engaging with the swinging bar, a reciprocating dog or latch pivotally mounted at its rear end and having its front end to engage with the upper end of the vertical arm of the L-lever, for the forward movement of the bar to raise the horizontal arm of the lever and lift the swinging bar and raise the weight, substantially as described.

11. In a sheet-delivery mechanism, the combination of retaining-weights, one on each side at the rear end of the mechanism, a swinging bar carrying a weight and pivotally mounted at its rear end, an L-lever having a vertical arm and a horizontal arm for the horizontal arm to engage the swinging bar, a reciprocating dog or latch pivotally mounted to have its rear end engage the upper end of the vertical arm of the L-lever, for the advance of the dog or latch to raise the horizontal arm of the L-lever and lift the swinging bar and weight, and a second dog or latch pivotally mounted at its rear end in a fixed relation for its forward end to engage the upper end of the vertical arm of the L-lever and hold the horizontal arm of the L-lever raised with the swinging bar lifted and the retaining-weight raised, substantially as described.

12. In a sheet-delivery mechanism, the combination of a side presser-foot at the rear end of the mechanism, a leg or support for the foot having the foot at its forward end, a vertical oscillating or rocking L-lever having the leg or support pivoted to one arm thereof, a contact between the leg or support and the arm of the vertical L-lever to which it is pivoted for raising the leg or support, a horizontal oscillating or rocking L-lever, a connection between the vertical L-lever and the horizontal L-lever, means for actuating the horizontal L-lever, a slide on which the vertical L-lever is pivoted, a base for the slide, a vertical L-lever pivotally mounted on the base, a pivoted reciprocating dog or latch to engage the vertical arm of the L-lever of the base and rock such lever, a second dog or latch to engage the pivoted L-lever of the base when at the limit of its advanced movement, a swinging bar engaged by the horizontal arm of the L-lever of the base, and a retaining-weight carried by the swinging bar for the foot to have an advance movement to raise the corner of the sheet of paper and to have the retaining-weight raised with the advance of the presser-foot and dropped with the return of the presser-foot, substantially as described.

13. In a sheet-delivery mechanism, a presser-foot at the forward end of the mechanism, a leg or support having the foot at its forward end, a rocking sleeve or hub having the leg or support pivoted thereto, contacts between the head or knee of the leg or support and its rocking sleeve or hub, a fork pivotally connected with the rocking sleeve or hub and means for reciprocating the fork to rock the sleeve or hub and raise the leg or support, substantially as described.

14. In a sheet-delivery mechanism, a presser-foot at the delivery end of the mechanism, a leg or support having the foot at its forward end, a rocking sleeve or hub having the leg or support pivoted thereto, contacts between the head or knee of the leg or support and its rocking sleeve or hub, a head or block pivotally connected with the rocking sleeve or hub, and a reciprocating pitman or rod for oscillating the head or block to rock the hub or sleeve and raise the leg or support, substantially as described.

15. In a sheet-delivery mechanism, a presser-foot at the delivery end of the mechanism, a leg or support having the foot at its forward end, a rocking sleeve or hub having the leg or support pivoted thereto, contacts between the head or knee of the leg or support and its rocking sleeve or hub, a head or block pivotally connected with the rocking sleeve or hub, a reciprocating rod or pitman carrying the head or block for the oscillation of the head or block to raise the leg or support, and an adjustable weight carried by the leg or support for returning the presser-foot to engage the sheet of paper, substantially as described.

16. In a sheet-delivery mechanism, presser-feet at the forward end of the mechanism, a leg or support for each foot having the foot at its forward end, a rocking sleeve or hub for each leg or support having the leg or support pivoted thereto, contacts between the head or knee of each leg or support and its rocking sleeve or hub, a fixed shaft on which the rocking sleeves or hubs are loosely mounted, a slide at each end of the fixed shaft and a bearing-plate for each slide engaging the face of the slide under pressure to create a friction for the slide in operating the presser-feet, substantially as described.

17. In a sheet-delivery mechanism, the combination of side presser-feet at the rear end of the mechanism, a leg or support for each foot having the foot at its inner end, a vertical oscillating or rocking L-lever for each leg or support having the leg or support pivoted to one arm thereof, a contact between the leg or support and the arm of the L-lever for raising the leg or support, a slide carrying the vertical oscillating or rocking L-lever, and a pressure-spring engaging the slide and creating friction therefor in operating each of the feet, substantially as described.

18. In a sheet-delivery mechanism, a presser-foot, an oscillating support having the presser-foot pivoted thereto, a slide carrying the oscillating support, and a pressure-plate engaging the slide and creating friction in operating the foot, substantially as described.

19. In a sheet-delivery mechanism, a presser-foot, an oscillating support carrying the presser-foot, a slide carrying the oscillating support, and a pressure-spring engaging the slide and creating a friction therefor in operating the presser-foot, substantially as described.

20. In a sheet-delivery mechanism, a presser-foot for engaging and moving a sheet of paper, and a cot or tube surrounding the foot and forming a cushion or pad to insure the action of the foot on the sheet of paper, substantially as described.

21. In a sheet-delivery mechanism, the combination of a swinging support, a retaining-weight adjustably carried by the support and means for raising the support to have the weight clear the pile of paper, substantially as described.

22. In a sheet-delivery mechanism, presser-feet at the delivery end of the mechanism, a leg or support for each foot having the foot at its forward end, a rocking sleeve or hub for each leg or support having the leg or support pivoted thereto, a loosely-mounted loop surrounding each foot and resting on the paper around the foot, and actuating means operating to rock the sleeves or hubs and through the sleeves or hubs raise, lower and move the legs or supports and the presser-feet within the space of the surrounding loops, substantially as described.

23. In a sheet-delivery mechanism, a roller-weight at the rear end of the mechanism centrally thereof transversely, to rest on the rear side of a pile of paper, a swinging support carrying the roller-weight for enabling the weight to rest on the paper and hold the pile of sheets against movement with the withdrawal of the upper sheet and without interfering with the withdrawal of the upper sheet, substantially as described.

24. In a sheet-delivery mechanism, a roller-weight at the rear end of the mechanism centrally thereof transversely, a pivoted or swinging arm carrying the roller-weight, and an adjustable weight carried by the pivoted or swinging arm, for enabling the roller-weight to bear on a pile of paper and hold the sheets in place with the withdrawal of the upper sheet and without interfering with such withdrawal, substantially as described.

25. In a sheet-delivery mechanism, the combination of side presser-feet at the rear end of the mechanism, means for operating the feet to raise the rear corners of the sheets, and an adjustable support for each foot for enabling the position of the feet to be changed, as required for operation with different sizes of sheets, substantially as described.

26. In a sheet-delivery mechanism, the combination of side presser-feet at the rear end of the mechanism, means for operating each side presser-foot to raise its rear corner of a sheet, a reciprocating slide for each foot and on which the foot is mounted, and a base-plate for each reciprocating slide each base-plate adjustable inwardly for carrying the presser-foot on each side inwardly to operate on sheets of different sizes, substantially as described.

27. In a sheet-delivery mechanism, the combination of side presser-feet, means for operating the side presser-feet for each foot to raise its corner of the sheet, a reciprocating slide for each foot, a base-plate having the reciprocating slide mounted thereon, a swinging plate carrying the base-plate and means for adjusting the base-plate on the swinging plate when swung inward to suit the requirements of sheets of different sizes, substantially as described.

28. In a sheet-delivery mechanism, the combination of side presser-feet at the rear end of the mechanism, a base-plate for each foot, a diagonal plate attached to each side of the machine and a sliding block on each diagonal plate, each block carrying a base-plate for the presser-foot for the adjustment of the sliding block to adjust the base-plate and its presser-foot to sizes of different sheets, substantially as described.

29. In a sheet-delivery mechanism, the combination of a platform or feed-table carrying the paper, a feed-shaft journaled in stationary bearings for operating the platform or feed-table, a friction-disk fixed on the feed-shaft, a movable friction-pawl swung from the shaft and operated to partially rotate the feed-shaft as required to raise the platform or feed-table the distance of the thickness of a sheet of paper, substantially as described.

30. In a sheet-delivery mechanism the combination of a platform or feed-table carrying the paper, a feed-shaft journaled in stationary bearings for operating the platform or feed-table, a friction-disk fixed on the feed-shaft, a movable friction-pawl swung from the shaft and engaging the disk, an arm or lever having the friction-pawl fixed thereon and a scale to gage the throw of the arm or lever to have the pawl operate and partially rotate the feed-shaft as required to raise the platform or feed-table the distance of the thickness of a sheet of paper, substantially as described.

31. In a sheet-delivery mechanism, the combination of a platform or feed-table carrying the paper, a feed-shaft journaled in stationary bearings for operating the platform or feed-table, a friction-disk fixed on the feed-shaft, a movable friction-pawl swung from the shaft and engaging the disk, an arm or lever having the friction-pawl fixed thereon and a graduated scale on the arm or lever for regulating the throw of the arm or lever to have the pawl operate and partially rotate the feed-shaft as required to raise the platform or feed-table the distance of the thickness of a sheet of paper, substantially as described.

32. In a sheet-delivery mechanism, the combination of a platform or feed-table carrying the paper, a feed-shaft journaled in stationary bearings for operating the platform or feed-table, a friction-disk fixed on the feed-shaft, a movable friction-pawl swung from the shaft and engaging the disk, an arm or lever having the friction-pawl fixed thereon, a graduated scale on the arm or lever and a slide movable on the arm or lever to coact with the scale and regulate the throw of the arm or lever to have the pawl operate and partially rotate the feed-shaft as required to raise the platform or feed-table the distance of the thickness of a sheet of paper, substantially as described.

33. The combination of a rotatable shaft mounted in stationary bearings, a fixed friction-face on the shaft, a movable friction-pawl swung from a fixed point and engaging the friction-face of the shaft and operating to advance the shaft as required for a partial rotation thereof, substantially as described.

34. The combination of a fixed friction-disk, a movable friction-pawl swung from a fixed point and engaging the disk, a pivoted arm or lever having the pawl fixed thereon, a slide on the arm or lever and means for actuating the arm or lever through the slide to engage and disengage the friction disk and pawl, for the engagement to advance the friction-disk, substantially as described.

35. The combination of a fixed friction-disk, a movable arm or lever and a friction-pawl in one swung from a fixed point, and means for actuating the arm or lever to cause the engagement and disengagement of the friction disk and pawl, substantially as described.

36. An arm and pawl having an angular relation one to the other and formed of a single integral piece, a pivot on which the arm and pawl are adapted to be pivotally mounted to swing from a fixed point, and a disk or wheel intermittently advanced from the engagement therewith of the pawl, substantially as described.

37. The combination of a friction-disk, a friction-pawl, an oscillating arm, the pawl and the arm formed in a single piece and having angular relation one to the other, a pivot at the junction of the pawl and arm, and a reciprocating rod connected directly with the arm, for giving the arm its oscillatory movement, substantially as described.

38. The combination of a friction-disk, a friction-pawl, an arm having a forward and backward movement given thereto, the pawl and the arm formed in a single piece, a pivot for the arm, and means for moving the lever in both directions and have the movement in one direction operate and cause the pawl to act as a stop for the forward motion of the periphery of the disk, substantially as described.

39. The combination with a friction-disk, of a movable lever, a fulcrum for the lever at a fixed distance from the periphery of the disk or pawl, and means acting directly on and moving the lever in both directions for the stroke of the lever in one direction to advance the periphery of the disk and for the reverse stroke of the lever to be non-operative on the disk, substantially as described.

40. In a sheet-delivery mechanism, the combination of a platform or feed-table carrying the paper, screw-threaded shafts one at each end of the platform or feed-table for operating the same, a feed-shaft journaled in stationary bearings for operating the screw-threaded shafts, a friction-disk fixed on the feed-shaft, and a lever having its fulcrum adjusted for the acting end of the lever to operate directly on the periphery of the friction-disk and partially rotate the feed-shaft as required to raise the platform or feed-table the distance of the thickness of a sheet of paper, substantially as described.

41. In a sheet-delivery mechanism, the combination of a platform or feed-table carrying the paper, screw-threaded shafts one at each end of the platform or feed-table for operating the same, a feed-shaft journaled in stationary bearings for operating the screw-threaded shafts, a friction-disk fixed on the feed-shaft, a lever having its fulcrum arranged for the acting end of the lever to operate directly on the periphery of the friction-disk and adjusted for the engagement with the periphery of the friction-disk to be below a central line extending through the friction-disk and lever-fulcrum, and a pitman adjustable on the lever and operating to move the lever and partially rotate the feed-shaft as required to raise the platform or feed-table the distance of the thickness of a sheet of paper, substantially as described.

ALVARO B. GRAHAM.

Witnesses:
 THOMAS A. BANNING,
 THOMAS B. McGREGOR.